US008276388B2

(12) United States Patent
Cayre et al.

(10) Patent No.: US 8,276,388 B2
(45) Date of Patent: Oct. 2, 2012

(54) OPTIMIZING AN ANTI-COKE FILM IN AN INJECTOR SYSTEM FOR A GAS TURBINE ENGINE

(75) Inventors: Alain Cayre, Pamfou (FR); Christophe Pieussergues, Nangis (FR); Jackie Raymond Julien Prouteau, Villecresnes (FR); Denis Jean Maurice Sandelis, Nangis (FR)

(73) Assignee: Snecma, Paris (FR)

( * ) Notice: Subject to any disclaimer, the term of this patent is extended or adjusted under 35 U.S.C. 154(b) by 1098 days.

(21) Appl. No.: 12/165,951

(22) Filed: Jul. 1, 2008

(65) Prior Publication Data

US 2009/0049840 A1 Feb. 26, 2009

(30) Foreign Application Priority Data

Jul. 12, 2007 (FR) ..................................... 07 56450

(51) Int. Cl.
*F02C 1/00* (2006.01)
*F02G 3/00* (2006.01)

(52) U.S. Cl. ................ 60/748; 60/740; 60/741; 60/742; 60/743; 60/744; 60/745; 60/746; 60/747

(58) Field of Classification Search ............. 60/740–748
See application file for complete search history.

(56) References Cited

U.S. PATENT DOCUMENTS 6,240,731 B1 * 6/2001 Hoke et al. ...................... 60/732
6,412,272 B1 * 7/2002 Titterton et al. ............. 60/39.37
7,013,649 B2 * 3/2006 Monty ............................ 60/748

FOREIGN PATENT DOCUMENTS

EP 0 927 854 A2 7/1999
EP 1 314 931 A2 5/2003
GB 2 123 137 A 1/1984
GB 2 296 084 A 6/1996

OTHER PUBLICATIONS

U.S. Appl. No. 12/333,732, filed Dec. 12, 2008, Pieussergues, et al.

* cited by examiner

*Primary Examiner* — Willaim H Rodriguez
*Assistant Examiner* — Craig Kim
(74) *Attorney, Agent, or Firm* — Oblon, Spivak, McClelland, Maier & Neustadt, L.L.P.

(57) ABSTRACT

An annular expansion ring centered on a main axis and suitable for being mounted on a fuel injector coaxial with the ring is disclosed. The ring presents holes that are distributed around the main axis and open out into its upstream face to enable air to pass towards the zone that is downstream from the ring. The ring includes a conical annular groove that converges downstream, that is open downstream, and that has the holes opening out into the upstream portion thereof. The axis of each of the holes makes an angle relative to the main axis that is strictly greater than the angle between the generator line of the cone defining the annular groove and the main axis, such that the air exiting from the holes impacts against the inner wall of the annular groove, i.e. its wall that is closer to the main axis.

13 Claims, 2 Drawing Sheets

OPTIMIZING AN ANTI-COKE FILM IN AN INJECTOR SYSTEM FOR A GAS TURBINE ENGINE

The present invention relates to the field of fuel injector systems.

BACKGROUND OF THE INVENTION

More particularly, the invention relates to an annular expansion ring centered on a main axis and suitable for mounting coaxially on a fuel injector, the ring presenting holes that are distributed around said main axis, that open out into its upstream face, and that enable air to pass towards the zone that is downstream from the ring.

As shown in FIG. 5, which represents the prior art, fuel is injected into a combustion chamber 100 (e.g. into a combustion chamber of a turbomachine) via an injector 10 situated at the end of a pipe delivering the fuel. The injector 10 is substantially cylindrical, and it possesses an annular expansion ring 220 about a main axis A and surrounding a portion of the injector 10, the injector being coaxial with the expansion ring. The expansion ring 220 comprises an axial cylindrical portion 222 with its radially inner surface in contact with or close to the outer surface of the injector 10. The role of the expansion ring 220 is to take up clearance between the injector 10 and the elements constituting the end wall of the combustion chamber, said clearance being caused by the thermal stresses to which these parts are subjected. During combustion, coke can become deposited on the downstream end 12 of the injector 10 as a result of incomplete combustion of the fuel. Deposits of coke are undesirable since they degrade the spraying of fuel by the injectors 10.

Throughout the description, and unless specified otherwise, the adjectives "upstream" and "downstream" are used relative to the normal flow direction of the fuel leaving the injector, i.e. from left to right in FIG. 5. The adjectives "inner" and "outer" relate to proximity relative to the main axis A.

In order to prevent such deposits from occurring, the expansion ring 220 is pierced by holes 226 that are directed substantially axially (i.e. along the direction of the main axis A) and that enable air to penetrate axially into the zone situated downstream from the injector 10. This air thus penetrates parallel to the circumferential side wall of the injector in the upstream zone thereof and forms a layer or film of air around the injector, thus serving to prevent coke from depositing on the downstream end of the injector. In FIG. 5, these holes 226 are formed through the radial wall 224 of the expansion ring 220 that extends the downstream end of the cylindrical portion 222 of the ring radially outwards.

In-service use and tests carried out by the Applicant have nevertheless shown that such a film of air gives rise to drawbacks. The parts constituting the combustion chamber end wall are situated immediately downstream from the injector. This applies in particular to the primary swirler 40 and to the venturi 50. Thus, the primary swirler 40 is an annular part placed coaxially about the injector 10, immediately downstream from the expansion ring 220, and it has an inside diameter that is greater than the diameter of the injector. The primary swirler 40 is pierced all around its circumference by primary holes 42, via which air penetrates into the zone situated downstream from the injector 10. The primary holes 42 are oriented in such a manner that their axes lie in a plane that is radial relative to the main axis, each having an angle of inclination relative to the circumference. Thus, the air leaving the primary holes 42 penetrates into the zone downstream from the injector 10, while turning around the main axis A, thereby forming a swirl or vortex. Immediately downstream from the primary swirler 40, there is the venturi 50 that is an annular part placed coaxially about the injector 10. The venturi 50 possesses a radial wall that is extended downstream (from its inner end) by a converging portion 52, i.e. a conical wall that tapers downstream towards the main axis A. The converging portion 52 is extended by a throat 54 and then by a diverging portion 56 that flares downstream. The converging portion 52 is thus situated downstream from the injector 10, and is situated substantially axially in line with the holes 226 in the expansion ring 220.

The tests carried out by the Applicant have shown that the air from the holes 226 penetrating into the zone downstream from the injector 10 (and from the ring 220) creates turbulence. The present invention seeks to remedy those drawbacks, or at least to attenuate them.

OBJECTS AND SUMMARY OF THE INVENTION

The invention seeks to provide an expansion ring such that the air coming from the holes formed therethrough penetrates into the zone downstream from the injector in a manner that is uniform, and without impacting on the downstream of the injector.

This object is achieved by the fact that the ring includes a conical annular groove that converges downstream, that is open downstream, and that has holes opening out into the upstream portion of the groove, the axis of each of the holes making an angle relative to the main axis that is strictly greater than the angle made by the generator line of the cone defining the annular groove relative to the main axis, such that the air exiting the holes impacts against the inner wall of the annular groove, i.e. its wall that is closer to the main axis.

By means of these dispositions, the air leaving the holes does not penetrate directly into the zone downstream from the injector, but begins by impacting against the inner wall of the annular groove, and is subsequently redirected along the annular groove. Thus, the air leaves the annular groove in uniform manner (i.e. the speed of the air leaving the annular groove is substantially uniform over the outlet orifice of the annular groove, and the flow of the air is therefore not turbulent). In addition, the angle made by the annular groove relative to the main axis is such that the air leaving the groove does not impact against the surface of the injector. Thus, no coke is deposited on the surface of the injector.

Advantageously, the expansion ring comprises a cylindrical portion about the main axis, and a radial wall that extends the downstream end of the cylindrical portion radially outwards, and the annular groove opens out downstream at the location where the cylindrical portion joins the radial wall.

Advantageously, each hole presents a circumferential angle of inclination relative to the main axis that imparts movement about the main axis to the air passing through the holes.

For example, this angle of inclination gives rise to a flow of air that is clockwise about the main axis in the fuel flow direction. Alternatively, this angle of inclination gives rise to a flow of air that is counterclockwise about the main axis in the fuel flow direction.

The invention also seeks to provide an injector system including an expansion ring such that the air coming from the holes through the ring does not lead to coke being deposited on the downstream end of the injector, and does not lead to coke being deposited on the converging portion of the venturi, where such deposits of coke are undesirable since they degrade the spraying of fuel by the injectors.

This object is achieved by the fact that the air leaving the annular groove does not impact against the downstream end of the injector and leaves the annular groove in a direction that is substantially parallel to the flow direction of the air leaving the primary swirler, such that these two air flows do not mix (or at least mix only further downstream).

By means of these dispositions, in addition to the fact that the air leaves the annular groove in uniform manner, this air does not cause coke to become deposited on the end surface of the injector, and this air does not disturb the flow of air leaving the primary swirler. Thus, no coke is deposited on the converging portion of the venturi.

Advantageously, the generator line of the cone defining the annular groove makes an angle relative to the main axis that is equal to or greater than the angle made by the converging portion of the venturi relative to the main axis, such that the air exiting from the annular groove does not impact against the converging portion of the venturi.

Thus, the probability of coke being deposited on the converging portion of the venturi is further diminished.

Consequently, the combustion chamber can operate with smaller fuel injection flow rates (with a lower extinction limit). For an airplane provided with engines (turbine engines) having such combustion chambers, the combustion chamber operates better at low speeds of the airplane.

BRIEF DESCRIPTION OF THE DRAWINGS

The invention can be better understood and its advantages appear more clearly on reading the following detailed description of an embodiment given by way of non-limiting example. The description refers to the accompanying drawings, in which.

MORE DETAILED DESCRIPTION

Figure 1:
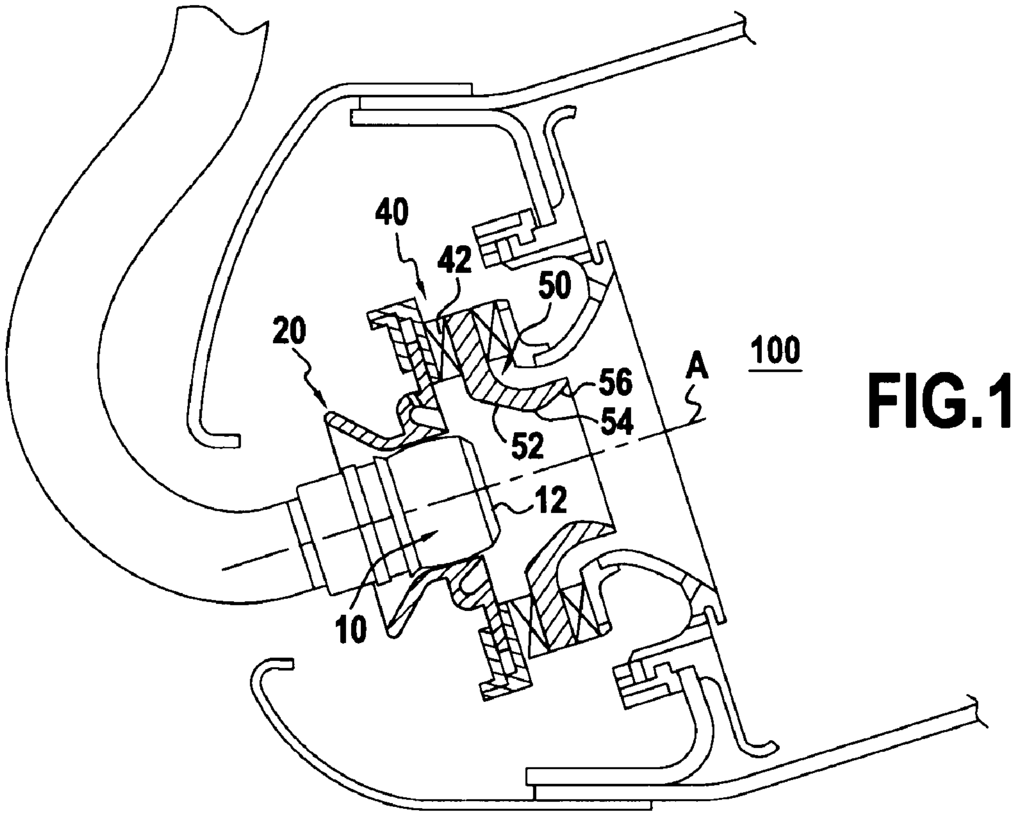
FIG. 1 is a section view of a combustion chamber injector system that includes an expansion ring of the invention.
Figure 5:
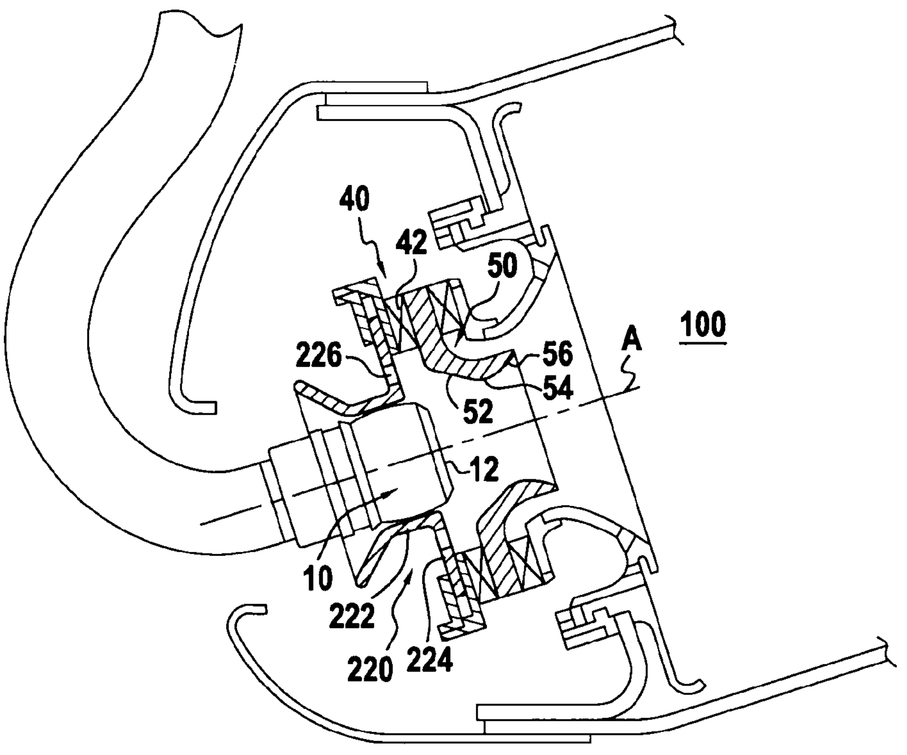
FIG.5 PRIOR ART
FIG. 5 shows a combustion chamber injector system including a prior art expansion ring.

FIG. 1 shows an injector system for a combustion chamber 100 of a turbomachine. The injector system is identical to that shown in FIG. 5 with the exception of the expansion ring. Fuel is injected into the combustion chamber 100 (e.g. into a combustion chamber of a turbomachine) via an injector 10. The injector 10 is substantially cylindrical, and possesses an expansion ring 20 that is annular about a main axis A and that surrounds a portion of the injector 10, the injector being coaxial with the expansion ring. The expansion ring 20 comprises an axial cylindrical portion 22 with its radially inner surface in contact or nearly in contact with the outer surface of the injector 10. Upstream from the cylindrical portion 22, the expansion ring 20 has a conical collar 21 that extends said cylindrical portion, flaring in an upstream direction. The cylindrical portion 22 and the collar 21 are of substantially constant thickness. The inner surface of the cylindrical portion 22 runs along the injector 10 as far as the downstream end 12 of the injector, i.e. the end of the injector 10 from which fuel is injected into the combustion chamber 100 that is situated downstream from the injector. The downstream end of the cylindrical portion 22 of the expansion ring 20 is either slightly upstream from or else in alignment with the downstream end 12 of the injector 10.

The downstream end of the cylindrical portion 22 is extended radially outwards by a radial wall 24, such that the inner face of the cylindrical portion 22 and the downstream face of the radial wall 24 are substantially at right angles. The radial wall 24 is of substantially constant thickness. At the upstream end of the radial wall 24, where said radial wall meets the cylindrical portion 22, the expansion ring 20 includes an annular swelling 30 that is substantially in the form of a torus. Thus, the upstream face of the radial wall 24 is extended upstream by the surface of the annular swelling 30, this surface meeting the outer face of the cylindrical portion 22. In longitudinal section, as shown in FIG. 1, the line representing the upstream face of the radial wall 24 is perpendicular to the main axis A, and it is extended at right angles in the upstream direction by the line representing the surface of the annular swelling 30, this line following substantially one-fourth of a circle as far as the line representing the outer face of the cylindrical portion 22. The line representing the surface of the annular swelling 30 meets the line representing the outer face of the cylindrical portion 22 at right angles. In other embodiments, it is equally possible for rounded transitions to be made between the surface of the annular swelling 30 and the upstream face of the radial wall 24 of the outer face of the cylindrical portion 22.

Figure 2:
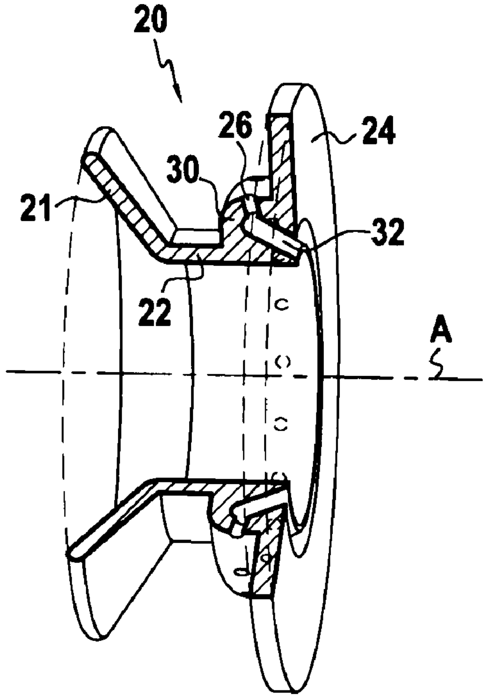
FIG. 2 is a perspective view of the expansion ring of the invention.
Figure 3:
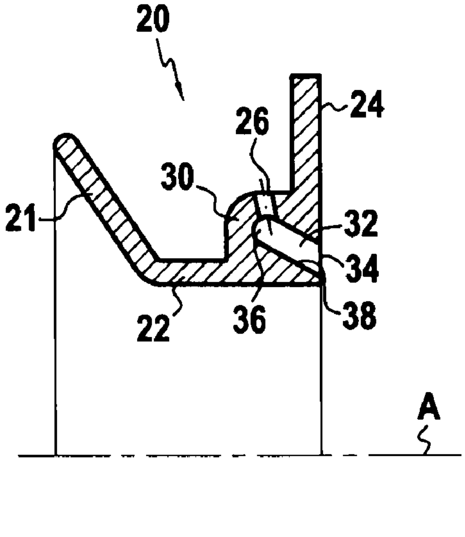
FIG. 3 is a longitudinal section view of the expansion ring of the invention.

FIGS. 2 and 3 show details of the structure of the expansion ring 20. The annular swelling 30 is hollowed out by a conical annular groove 32 that converges downstream, and that is open at its downstream end 34. The annular groove 32 thus forms a continuous cavity. This annular groove 32 is defined by an inner wall 38, an outer wall facing the inner wall 38, and a wall that is substantially toroidal (presenting the shape of half a torus with the main axis A as its axis of revolution, and terminated on a plane that is substantially perpendicular to its axis of revolution). The inner wall 38 and the outer wall of the annular groove 32 are substantially parallel and are joined together by the substantially toroidal wall.

In the upstream portion of the annular groove 32, rectilinear holes 26 that are distributed around the main axis A open out at one end in the substantially toroidal wall, and at the other end in the surface of the annular plane 30. The holes 26 could be slots.

The axis of each of the holes 26 intersects the main axis A. The holes 26 are not situated in line with the annular groove 32, i.e. the axis of each hole is not parallel to the generator line of the cone defining the annular groove 32. In addition, the axis of each hole 26 is at an angle relative to the main axis A that is strictly greater than the angle made relative to said main axis by the generator line of the cone defining the annular groove 32, such that the air coming from outside the combustion chamber and leaving the holes 26 impacts against the inner wall 38 of the annular groove 32. Typically, the air leaving the holes 26 impacts against the inner wall 38 within the upstream first third of the annular groove 32. Thus, after impacting against the inner wall 38, the air is redirected along the annular groove 32, and it leaves the groove in uniform manner.

Typically, the holes 26 are of a diameter lying in the range 0.8 millimeters (mm) to 1.5 mm, such that the air emerging from these holes into the annular groove 32 presents a flow rate and a flow speed such as to ensure better uniformity of the air leaving the annular groove 32.

Typically, the number of holes 26 lies in the range 10 to 20.

Typically, the height of the groove (the distance between the inner wall 38 and the outer wall) lies in the range 1.5 mm to 3 mm. The length of the groove lies in the range 2 to 3 times its height.

Because of the aligned or slightly setback position of the expansion ring 20 relative to the end 12 of the injector 10, the air does not impact against said end 12, thus avoiding coke becoming deposited thereon.

Figure 4:
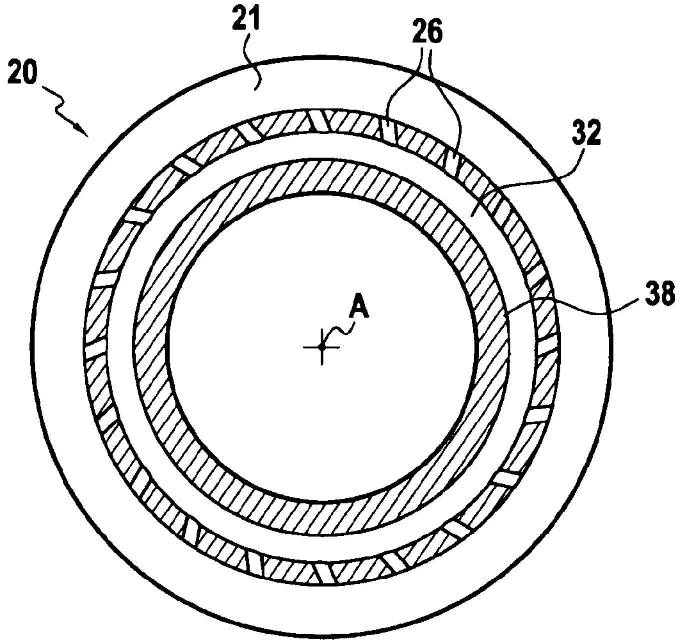
FIG. 4 is a cross-section view of another embodiment of the expansion ring of the invention.

FIG. 4 is a cross-section through the holes 26 in an expansion ring 20 constituting another embodiment of the invention. The holes 26 present an angle of inclination relative to the circumference, i.e. the axis of each of the holes 26 does not intersect the main axis A. Typically, the circumferential angle of inclination of each hole 26 lies in the range 20° to 40° (in absolute value), i.e. the holes 26 as inclined in this way cause the air to circulate in the clockwise direction or in the counterclockwise direction about the main axis A and relative to the fuel flow direction. In FIG. 4, this air circulation is generated in the clockwise direction.

In FIGS. 1 to 4, the downstream end of the inner wall 38 of the annular groove 32 and the upstream end of the inner face of the cylindrical wall 22 meet substantially at a point. Alternatively, the annular groove 32 could have a larger radius (i.e. it could be further away from the main axis A), with the annular swelling 30 being offset outwards. Under such circumstances, the downstream end of the inner wall 38 of the annular groove 32 and the downstream end of the inner face of the cylindrical wall 22 do not meet at the downstream face of the radial wall 24, but are joined together via a portion of said downstream face.

As shown in FIG. 1, combustion chamber end wall parts are situated immediately downstream from the injector 10 and the expansion ring 20. These parts comprise in particular the primary swirler 40 and the venturi 50. Thus, the primary swirler 40 is an annular part coaxial about the injector 10 that is placed immediately downstream from the expansion ring 20 and that is of inside diameter greater than the diameter of the injector 10. The primary swirler 40 is pierced all around its circumference by primary holes 42 through which air penetrates into the zone situated downstream from the injector 10. The primary holes 42 are oriented in such a manner that their axes lie in a plane that is axial relative to the main axis, with a circumferential angle of inclination. Thus, the air leaving the primary holes 42 penetrates into the zone downstream from the injector 10 while turning about the main axis A and thus forming a swirl or vortex. Depending on the circumferential angle of inclination of the holes 26 in the annular groove 32, the air delivered via these holes 26 leaves the annular groove 32 turning either in the same direction as or in the opposite direction to the air leaving the primary holes 42. In order to avoid creating turbulence, it is preferable for the air to leave the annular groove 32 turning in the same direction as the air leaving the primary holes 42.

Under all circumstances (regardless of whether the holes 26 of the annular groove have a zero or other circumferential angle of inclination), the angle between the generator line of the cone defining the annular groove 32 relative to the main axis A is such that the air that has passed through the holes 26 does not mix with the air that has passed through the primary holes 42, or at least does not mix immediately.

Immediately downstream from the primary swirler 40 there is the venturi 50 that is an annular part coaxial about the injector 10. The venturi 50 possesses a radial wall that is extended downstream from its inner end by a converging portion 52 constituted by a conical wall tapering towards the main axis A on going downstream. The converging portion 52 is extended by a throat 54 and then by a diverging portion 56 that flares on going downstream. The converging portion 52 is thus situated downstream from the injector 10. The angle between the generator line of the cone defining the annular groove 32 relative to the main axis A is equal to or greater than the angle made by the converging portion of the venturi relative to said main axis A, such that the air that has passed through the holes 26 of the annular groove 32 does not impact against the converging portion 52. As a result, coke is not deposited on the converging portion of the venturi. Since air (possibly mixed with fuel) does not impact directly against the converging portion 52, no turbulence is produced in the vicinity of the surface of said converging portion, so there is no dead zone where air presents a speed of zero and in which coke could form on the surface on the converging portion 52.

The angle of inclination of the annular groove 32 thus depends on the angle of inclination of the converging portion 52 of the venturi. The angle made by the generator line of the cone defining the annular groove 32 relative to the main axis A typically lies in the range 30° to 60°.

The invention is described above for an injector system of a turbomachine combustion chamber. Nevertheless, the expansion ring of the invention could be used with any injector on which it can be mounted.

What is claimed is:

1. An injection system comprising:

a fuel injector of main axis;

an annular expansion ring coaxial about said injector, said ring presenting holes distributed around the main axis and opening out into an upstream face of said ring, the holes allowing air to pass towards a zone downstream from said ring;

a primary swirler coaxial about the same axis as said ring and placed downstream from said injector; and a venturi placed downstream from said primary swirler, wherein said ring includes a conical annular groove that converges downstream, that is open downstream, and that has said holes opening out into an upstream portion of said annular groove, an axis of each of the holes making an angle relative to the main axis that is strictly greater than an angle made by a generator line of a cone defining said annular groove relative to said main axis, such that the air exiting said holes impacts against an inner wall of the annular groove, the inner wall of said annular groove being closer to the main axis, wherein the air leaves said annular groove in a direction that is substantially parallel to a flow direction of air leaving said primary swirler, such that these two air flows do not mix, and wherein said expansion ring comprises an axial cylindrical portion with a radially inner surface in contact or nearly in contact with an outer surface of said injector.

2. An injector system according to claim 1, wherein said expansion ring comprises a radial wall that extends a downstream end of said cylindrical portion radially outwards, and wherein said annular groove opens out downstream at the location where said cylindrical portion joins said radial wall.

3. An injector system according to claim 1, wherein each of said holes presents a circumferential angle of inclination relative to said main axis that imparts movement about the main axis to the air passing through the holes.

4. An injector system according to claim 3, wherein the circumferential angle of inclination of said holes lies in the range 20° to 45° relative to a radial direction.

5. An injector system according to claim 1, wherein said holes have a diameter lying in the range 0.8 mm to 1.5 mm.

6. An injector system according to claim 1, wherein the number of said holes lies in the range 10 to 20.

7. An injector system according to claim 1, wherein a height of said annular groove lies in the range 1.5 mm to 3 mm.

8. An injector system according to claim 1, wherein the air exiting from said holes in the ring impacts against the inner wall of the annular groove in a location situated within an upstream first third of the annular groove.

9. An injector system according to claim 1, wherein said primary swirler possesses primary holes through which air penetrates into the zone situated downstream from said injector.

10. An injector system according to claim 1, wherein said venturi possesses a converging portion that converges downstream, and wherein a generator line of a cone defining said annular groove makes an angle relative to said main axis that is equal to or greater than an angle made by said converging portion of the venturi relative to said main axis, such that the air exiting from said annular groove does not impact against the converging portion of the venturi.

11. A combustion chamber provided with an injector system according to claim 1.

12. A turbomachine including a combustion chamber according to claim 11.

13. An injector system according to claim 1, wherein said annular groove forms a continuous cavity circumferentially about the main axis.

* * * * *